United States Patent

Stegenga

[15] 3,686,681

[45] Aug. 22, 1972

[54] PEN ACTUATING MECHANISM FOR GRAPHICAL DISPLAY PLOTTER

[72] Inventor: Jerry A. Stegenga, Coral Gables, Fla.

[73] Assignee: Milgo Corporation, Miami, Fla.

[22] Filed: April 20, 1970

[21] Appl. No.: 29,878

[52] U.S. Cl. ................................346/141, 346/139 C
[51] Int. Cl. ..............................................G01d 15/24
[58] Field of Search .............346/141, 140, 29, 139 C

[56] References Cited

UNITED STATES PATENTS

| | | | |
|---|---|---|---|
| 2,566,546 | 9/1951 | Barnes et al. | 346/139 R |
| 2,936,207 | 5/1960 | Beaumont et al. | 346/141 X |
| 3,125,401 | 3/1964 | Boone | 346/141 X |
| 3,401,401 | 9/1968 | Read et al. | 346/141 X |

*Primary Examiner*—Joseph W. Hartary
*Attorney*—Beveridge & De Grandi

[57] ABSTRACT

Graphical displays may be plotted on a vertical or horizontal bed requiring different pen pressures and may require the use of pens of several different types each requiring a different pressure for successful high resolution plotting. This invention provides for receiving pens of different kinds in an X–Y plotter which moves over the face of a bed according to electrical signals and applies pen pressure for marking, according to other signals, in which it is necessary to apply differing pressures in accordance with the pen type and the ink employed as well as the orientation of the plotting bed. A holder is provided with a magnet and armature attached to a fork which lifts the pen from the writing surface when not in use by virtue of a hold-off spring. The resulting pressure of the pen point on the surface is selectable according to whether the armature causes one or more of a number of writing springs to engage the pen holder for urging it toward the surface when the magnet is actuated.

3 Claims, 6 Drawing Figures

Patented Aug. 22, 1972

INVENTOR

JERRY A. STEGENGA

BY Beveridge & De Grandi

ATTORNEYS

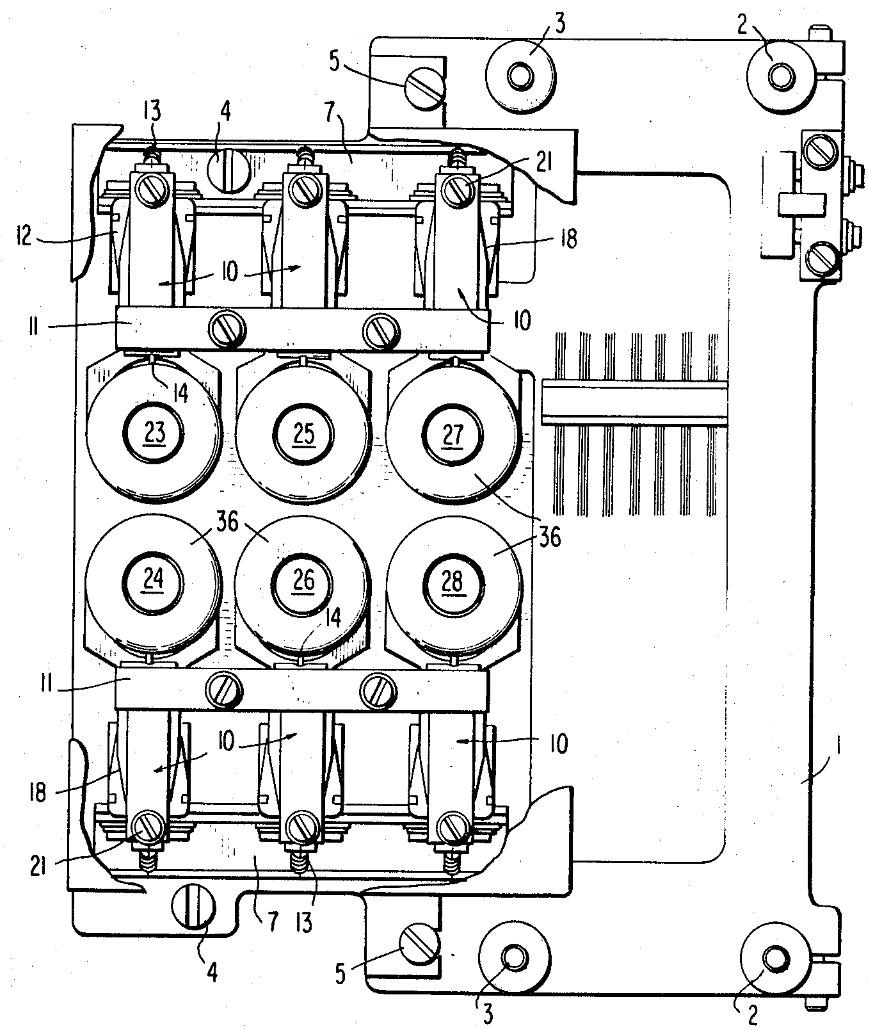
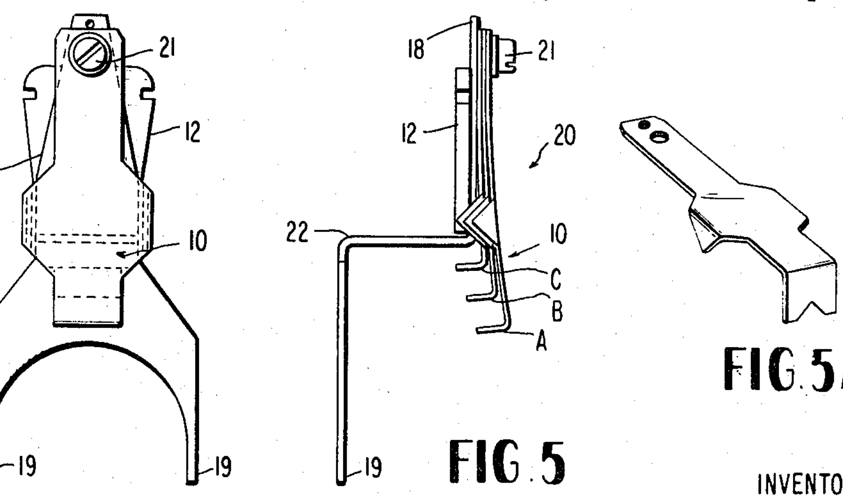
INVENTOR
JERRY A. STEGENGA
BY Beveridge & De Grandi
ATTORNEYS

PEN ACTUATING MECHANISM FOR GRAPHICAL DISPLAY PLOTTER

BACKGROUND OF INVENTION

Many advances have been made in the field of controls, particularly for use with computers, over the past several years, and the result is a need for increased facilities in displaying computer output in graphical form. A number of plotting board types have been employed including means for two-dimensional plotting symbols of different kinds or different representations on the same chart using different colored inks. An example of such a recorder is shown in U.S. Pat. No. 3,145,070. However, adjustments requisite to plotting with pens or markers of different types have generally required the services of a skilled mechanic. Prior writing heads would not admit of pens of different types accommodated in the same plotting mechanism. In a general purpose plotter it is important that pens of ball point type, capillary tube ink feeding pens, and fiber pens be employed interchangeably according to the particular service conditions, which have heretofore required modification of the printing head or the use of different plotting machines, with a considerable cost and inconvenience to the user.

It is accordingly an object of this invention to provide a multi-pen mounting and adapter for accepting pens of all standard types in the same writing head.

It is also an object of this invention to provide means for adjusting in the field without tools the pressure applied to pens of different types employed in the writing head.

A further object of this invention is to provide a simple and effective method of quickly changing pen points and pressures in the field without the use of any tools or any modification of the structure.

Basically the invention consists of the provision of a pen holder adapted to receive either a fiber tip inking mechanism, a capillary tube inking pen, a ball point writing pen or a Leroy pen, interchangeably, a number of such pen holders being mounted preferably on the same writing head so that the different pen types or the different ink colors can be selectably positioned to write according to a prearranged code and selected responsively to a machine output determining what mark is to be made at what position on an X–Y plotting board. The pen holder includes, for each pen position, a housing attached to a base forming a portion of the writing head adjacent an aperture in which a pen holder reciprocates to and from the writing surface and is pushed into pen engagement with the writing surface either by gravity or by adjustable spring pressure, or a combination of both. The pen is enclosed in the pen holder in which a spring holds the pen out of engagement with the writing surface until a magnet is actuated to drop the pen upon the surface or force the pen into engagement under variable pressure according to the number of springs engaged with the pen holder upon actuation of the magnet. In order to avoid the requirement for adjusting and calibrating different springs or different spring pressures, this invention makes use of a plurality of springs of different length which engage the pen holder in accordance with the length of an engaging pen attached to the pen holder which then is contacted by one, two, three or more of the springs attached to the magnet armature.

This invention will be better understood as the description proceeds in connection with the drawings, in which:

FIG. 2 is a plan view of the apparatus of FIG. 1.

FIG. 4 is a plan view of a fork lift for the holder of FIG. 3.

FIG. 5 is a side elevational view of the fork lift of FIG. 4 carrying springs for applying writing pressure, and FIG. 5A is a detail of the spring arrangement according to FIG. 5.

Figure 1:
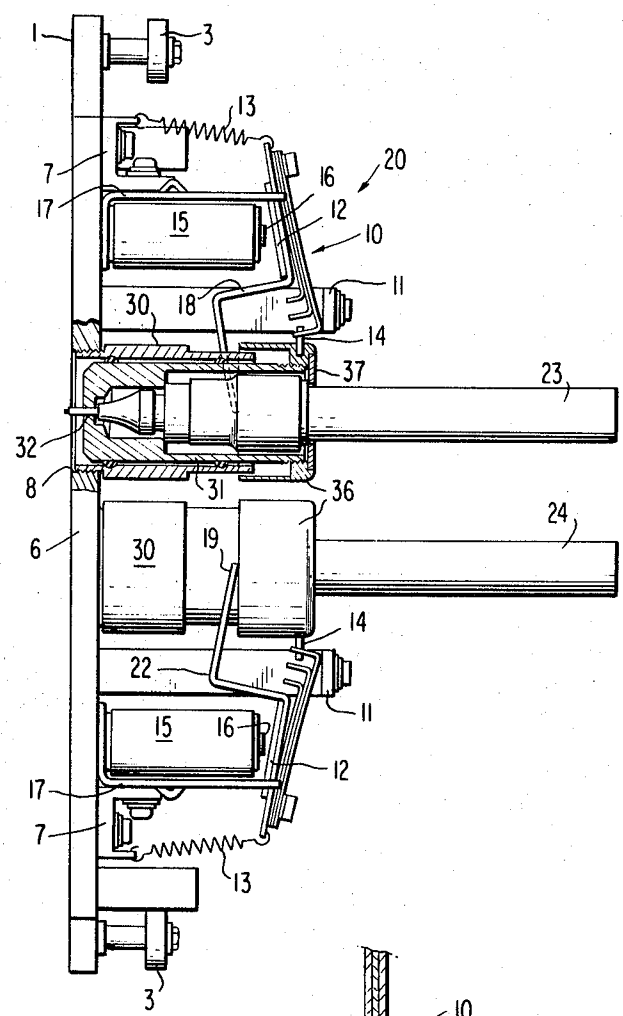
FIG. 1 is a front elevation partly broken away for a multi-pen applicator according to this invention.

Proceeding now to a more detailed description of apparatus according to this invention, there is shown in FIG. 1 and FIG. 2 a carriage 1 suitable for support above or adjacent a graphical display chart for movement in two directions thereover. The method of transporting the carriage and the control of the positioning is not a part of this invention but may be practiced generally in accordance with the teachings of the aforementioned patent. Means supporting carriage 1 above a display chart (not shown) may include carriage mounting means 2 and 3 which may be sliding or rotary supports for the carriage cooperating with transporting means to accurately position the base of the writing head in near juxtaposition to the chart on which the graphical representation is to be constructed, the carriage being moved along by cables attached at 4. Fasteners 5 attach a cover to carriage 1.

A writing head such as illustrated in FIG. 1 includes on carriage 1 a support 7 which may carry various portions of the pen actuating mechanism also here illustrated as supporting hold-off springs 13 and actuating magnets 15 later described. Carriage 1 has apertures 8 corresponding to each of the pen positions. In writing head as illustrated a number of pens having different inks are available, mounted in slightly different positions. Electronic readout for the positioning of carriage 1 would differ according to the pen selected for actuation, these differing writing signals being a part of the computer output when the graphical display is to be generated in response to a computer-generated configuration. Means actuating lateral transport for carriage 1 is not shown other than supports 2, 3 and cable anchors 4 for effecting movement in one direction, carriage transport in the perpendicular direction not being shown. It will be understood that a high precision digitally actuated transport is contemplated, although analog movement may be adopted. The present invention relates not to the positioning of the writing head or the individual pen used but to the actuation of the pens to and from the writing position.

When a horizontal plotting board is employed and it also is contemplated that a highly fluid ink be conducted thereto by capillary tubing very little pressure is required for effectively marking on the chart. This may be supplied in the case of a horizontal mounting by gravity associated with the pen mounting. Gravity does not suffice when the plotting board is vertical or when a pen pressure exceeding the pressure induced by gravity is required. For example, pressure required for ball point pen writing to be effective and certain is many times that required for highly fluid tubular ink pens or fiber tipped pens. For the purpose of supplying sufficient writing pressure to give accurately predictable line widths and accurate plotting, for example, a careful control of the writing pressure is required. This is supplied by hold-down springs generally shown at 10 and which may be selectively engaged according to the desired writing pressure. Springs A, B and C are shown attached to the armature of an electromagnet which is actuatable according to the signal for writing and which has a retracted position stop 11 which engages either the armature or the springs as the magnet is relaxed. As illustrated in FIG. 1, stop 11 engages one or more of the holddown springs 10 attached to armature 12, held in the retracted position by return spring 13, except when the magnet is operated by energizing the magnet according to control signals by means not herein shown. As the magnet is operated armature 12 is moved toward the writing surface carrying with it springs 10 against the pressure of hold-off or return spring 13 such that any selected number of springs 10 engage pins 14, 14', or 14'' as may be attached to the pen holder.

An electromagnet 15 having a core and pole piece 16 and a return magnetic path 17 to which armature 12 is hinged, is preferably mounted on carriage 1 and may be secured directly thereto or secured to support 7 which, in turn, is secured to carriage 1. In this respect, magnet 15 and its associated structure is similar to conventional relay magnets but has attached thereto a fork lift device shown at 18 having prongs 19 for engaging the pen holder to remove it from contact with the writing medium. One or more springs 10 attached to the fork lift 18 comprise an application pressure assembly 20 in which springs 10 are secured to the upper side of the plate as by screw 21, and have an offset portion 22 for engaging a shouldered portion of the pen holder.

Figure 3:
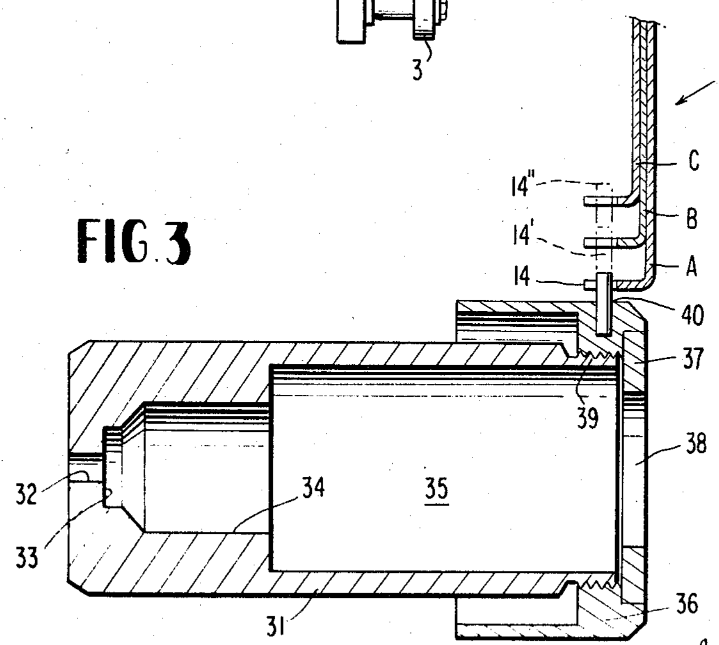
FIG. 3 is a sectional view of a pen holder taken along line 3—3 of FIG. 1.

As illustrated in FIG. 2, the carriage and pen carrier may have a group of pens 23, 24, 25, 26, 27 and 28 each supported in its own pen holder for reciprocating motion to or from the writing surface through an aperture as at 8. A pen holder support sleeve 30 is preferably attached within aperture 8 as to have its axis perpendicular to the writing surface. Support sleeve 30 receives the pen holder having a sleeve or hollow body 31 slidable therein. Holder sleeve 31 has an aperture 32 for receiving the pen point, of whichever type may be employed, and has a shoulder 33 adjacent aperture 32 and a hollow body or receiving portion 34 for receiving a pen such as 23–28, more particularly shown in FIG. 3. An enlarged portion of the complete pen body receiver is shown at 35 having a shape suitable for receiving a collar attached to a pen of any type which may be desired for the particular writing application intended. For example, a ball point pen may attach to a collar within portion 35 of the pen body receiver or the collar may be omitted when the pen is of a form which fits into the body portion 34 and held in place without the collar.

The pen receiver has a pen retainer cap 36 preferably shouldered at the bottom for engagement with the prongs 19 of fork assembly 20. The retainer cap may be screwed to the receiver 31 or otherwise secured, and preferably has a washer 37 having an aperture 38 of a size to pass snugly over the pen. A retainer cap 36 is illustratively attached to sleeve 31 by a threaded connection 39 and has a suitable receptacle 40 for receiving a pin 14. Pin 14 may be press-fitted into a receptacle in cap 36 or may be more permanently secured, for example, in a situation in which each of pens 23-28 is of a different type, some of which are actuated by a pin of configuration 14 while others require a pin of increased length as at 14' or 14'' in accordance with the number of springs 10 to be engaged for applying appropriate spring pressure.

With reference to FIG. 5 and FIG. 5A, it will be seen that no pin 14 is needed in the event a capillary tube type of pen is employed in a horizontal plotting board. For a vertical plotting board a light spring pressure may be desired as might be applied by a single spring A engaging a short pin 14. Additional pressure is applied to the pen holder and thence to the contained pen by the use of a spring A and a spring B both engaged by a longer pin 14' attached to cap 36 at 40. A still higher pressure is applied by selecting a pin 14'' adequate to engage springs A, B and C simultaneously. Providing a fork assembly for lifting a pen holder and for forcing it into writing contact with the writing medium in which a plurality of springs A, B and C is supplied, makes adjustments simple and precise since it is only necessary to change the length of pin 14 to secure a contact pressure of the desired amount. Spring adjustment is an operation which may be performed as a simple replacement of one length pin for another, as by selecting different caps 36 having different fixed pins. This is thus the only adjustment required to adapt an X–Y plotter to a wide variety of graphical representations, or display uses in which a number of pens having inks of different color or pens of different size or shape may be employed. By the selection of one of a larger number of pens a wide range of graphical representation can be made. It will be understood that a variety of pen shapes or sizes will require a variety of pen pressures here illustrated to be three differing steps of pressure in addition to the gravity pressure for a horizontal board. When still greater pressures are required, it is of course contemplated that the springs will be replaced by springs of greater stiffness attached to fork lift plate 18 as by screw fastener 21.

The invention has been described in connection with particular illustrations adapting a single X–Y plotting head to multiple uses thus to increase salability of the plotter for many different purposes requiring no skilled adjustment. The invention may be applied in differing forms and the form illustrated and described is not intended to be limiting other than in accordance with the attached claims.

What is claimed is:

1. Apparatus for yieldably retaining a marking pen out of contact with a writing surface over which it is caused to move and for applying overriding pressure for variably forcing said pen into contact with said surface according to an electrical signal, comprising mounting means comprising a sleeve disposed substantially perpendicularly to said surface and including retaining means for holding a pen structure fixedly therein and maintaining orientation thereof relative to said surface while permitting pen motion to and from the surface, lifting means comprising a retracting spring biasing a portion of said mounting means away from said surface and a pivotally mounted yoke engaging said sleeve and retracting spring for yieldably retracting said pen from contact with said surface, electromagnet and armature means secured to said fork and responsive to an electrical signal for counteracting said lifting means when operated to permit movement of said pen against said surface, and a plurality of writing pressure augmenting springs actuated according to actuation of said armature and disposed for selective engagement with said pen.

2. Apparatus for yieldably retaining a marking pen out of contact with a writing surface over which it is caused to move and for applying overriding pressure for variably forcing said pen into contact with said surface according to an electrical signal, comprising mounting means engaging said pen for maintaining orientation thereof relative to said surface comprising a sleeve reciprocable toward and from said surface, lifting means yieldably retracting said pen from contact with said surface, means responsive to an electrical signal for counteracting said lifting means to permit movement of said pen against said surface, said means for counteracting said lifting means comprising a magnetic actuator disposed adjacent of said sleeve in control of an armature, said armature being coupled to said lifting means for overriding said yieldably retracting means, means causing predetermined writing pressure of said pen against said surface comprising a plurality of spaced-apart springs for applying writing pressure to said sleeve, and means attached to said pen for engaging at least one said spring whenever said armature is actuated.

3. Apparatus according to claim 2, said means attached to said pen being a rigidly attached cantilever member having a dimension extending substantially parallel with said springs sufficient to engage a selected number thereof, said springs terminating at different distances from said sleeve.

* * * * *